United States Patent
Wang et al.

(10) Patent No.: US 11,100,934 B2
(45) Date of Patent: Aug. 24, 2021

(54) METHOD AND APPARATUS FOR VOICEPRINT CREATION AND REGISTRATION

(71) Applicant: BAIDU ONLINE NETWORK TECHNOLOGY (BEIJING) CO., LTD., Beijing (CN)

(72) Inventors: Wenyu Wang, Beijing (CN); Yuan Hu, Beijing (CN)

(73) Assignees: BAIDU ONLINE NETWORK TECHNOLOGY (BEIJING) CO., LTD., Beijing (CN); SHANGHAI XIAODU TECHNOLOGY CO. LTD., Shanghai (CN)

(*) Notice: Subject to any disclaimer, the term of this patent is extended or adjusted under 35 U.S.C. 154(b) by 167 days.

(21) Appl. No.: 16/477,121

(22) PCT Filed: Nov. 30, 2017

(86) PCT No.: PCT/CN2017/113772
§ 371 (c)(1),
(2) Date: Jul. 10, 2019

(87) PCT Pub. No.: WO2019/000832
PCT Pub. Date: Jan. 3, 2019

(65) Prior Publication Data
US 2019/0362724 A1 Nov. 28, 2019

(30) Foreign Application Priority Data
Jun. 30, 2017 (CN) .......................... 201710527022.7

(51) Int. Cl.
*G10L 17/04* (2013.01)
*G10L 17/22* (2013.01)

(52) U.S. Cl.
CPC .............. *G10L 17/04* (2013.01); *G10L 17/22* (2013.01)

(58) Field of Classification Search
CPC ......... G10L 17/04; G10L 17/22; G10L 17/24; G10L 17/06
See application file for complete search history.

(56) References Cited

U.S. PATENT DOCUMENTS

| 2010/0131273 A1* | 5/2010 | Aley-Raz | ................ G10L 17/04 |
| | | | 704/247 |
| 2015/0019220 A1* | 1/2015 | Talhami | ................ G10L 15/063 |
| | | | 704/244 |

(Continued)

FOREIGN PATENT DOCUMENTS

| CN | 104967622 A | 10/2015 |
| CN | 105185379 A | 12/2015 |

(Continued)

OTHER PUBLICATIONS

Extended European Search Report from EP app. No. 17915945.4, dated Jul. 2, 2020.

(Continued)

*Primary Examiner* — Huyen X Vo
(74) *Attorney, Agent, or Firm* — Ladas & Parry, LLP

(57) ABSTRACT

A method and an apparatus for voiceprint creation and registration, comprising: prompting to create a voiceprint and register when a device is enabled for a first time(101); using a text-related training method to create a voiceprint model for a user(102); generating an ID for the user(103); and prompting the user to input user ID-related data; storing the ID for the user and the voiceprint model correspondingly in a voiceprint registration database(104). The problems in the prior art that the technology of the voiceprint creation and registration method has a high learning cost and is more disturbing to the user may be avoided. The voiceprint (Continued)

creation process may cover various scenes, the voiceprint creation may guide the user in all stages, or the voiceprint creation is separated from registration through a frequency to minimize user's disturbance, and after the user is guided to register the voiceprint, the speech interaction product may provide personalized service to the user based on the voiceprint.

7 Claims, 5 Drawing Sheets

(56) References Cited

U.S. PATENT DOCUMENTS

| | | | |
|---|---|---|---|
| 2015/0032451 A1* | 1/2015 | Gunn | G10L 15/20 704/244 |
| 2015/0039311 A1* | 2/2015 | Clark | G10L 25/84 704/244 |
| 2015/0235642 A1 | 8/2015 | Nishikawa et al. | |
| 2015/0302856 A1 | 10/2015 | Kim et al. | |
| 2016/0314790 A1 | 10/2016 | Tsujikawa et al. | |
| 2016/0372116 A1* | 12/2016 | Summerfield | G10L 25/63 |
| 2016/0372121 A1 | 12/2016 | Li et al. | |
| 2017/0004832 A1 | 1/2017 | Du et al. | |
| 2018/0358113 A1* | 12/2018 | Cronin | G16H 40/63 |

FOREIGN PATENT DOCUMENTS

| | | |
|---|---|---|
| CN | 105656887 A | 6/2016 |
| CN | 105913850 A | 8/2016 |
| CN | 106057206 A | 10/2016 |
| CN | 106098068 A | 11/2016 |
| CN | 106782571 A | 5/2017 |
| CN | 106847292 A | 6/2017 |
| JP | 5864548 A | 4/1983 |
| JP | 2002330100 A | 11/2002 |
| JP | 2009109712 A | 5/2009 |
| JP | 2009237774 A | 10/2009 |
| JP | 2015153258 A | 8/2015 |
| WO | 2015033523 A1 | 3/2015 |
| WO | 2016123900 A1 | 8/2016 |

OTHER PUBLICATIONS

Communication pursuant to Rules 70(2) and 70a(2) EPC from EP app. No. 17915945.4 dated Jul. 21, 2020.
Notice of Reasons for Refusal from JP app. No. 2019-530680, dated Jul. 28, 2020, with English translation from Global Dossier.
Larcher et al., Text-dependent speaker verification: Classifiers, databases and RSR2015. Speech Communication, vol. 60, pp. 56-77.
International Search Report for PCT/CN2017/113772 dated Mar. 27, 2018 and its English translation provided by WIPO.
Written Opinion of the International Search Authority for PCT/CN2017/113772 dated Mar. 27, 2018 and its English translation provided by Google Translate.
Chinese State Intellectual Property Office Search Report for related Chinese Application No. 201710527022.7 dated Jun. 30, 2017 and its English translation provided by Google Translate.
Notification of Reason for Refusal for KR app. No. 10-2019-7016874, dated Jan. 6, 2021, with English translation from Global Dossier.
Communication pursuant to Rule 164(1) EPC from EP app. No. 17915945.4, dated Feb. 7, 2020.
Written Opinion of the International Searching Authority from PCT/CN2017/113772, dated Mar. 27, 2018, with English translation from WIPO.
International Preliminary Report on Patentability from PCT/CN2017/113772, dated Dec. 31, 2019 with English translation from WIPO.

\* cited by examiner

METHOD AND APPARATUS FOR VOICEPRINT CREATION AND REGISTRATION

CROSS-REFERENCE TO RELATED APPLICATIONS

The present application is the U.S. national phase of PCT Application No. PCT/CN2017/113772 filed on Nov. 30, 2017, which claims priority to the Chinese Patent Application No. 201710527022.7 entitled "Method and Apparatus for Voiceprint Creation and Registration" filed on Jun. 30, 2017, the entire disclosures of which are hereby incorporated by reference in their entireties.

TECHNICAL FIELD

The present disclosure relates to the field of application of artificial intelligence, and particularly to a method and an apparatus for voiceprint creation and registration.

BACKGROUND

Artificial intelligence, abbreviated as AI, is a new technological science which researches and develops theories, methods, techniques and application systems for simulating, extending and expanding human intelligence. Artificial intelligence, as a branch of computer sciences, is intended to learn about essence of intelligence and creates a new intelligent machine which is capable of responding in a manner similar to human intelligence. Research in the field includes robots, language recognition, image recognition, natural language processing, expert systems and the like. A very important aspect of artificial intelligence is voiceprint recognition technology.

In recent years, artificial intelligence technology has developed far-reaching and gradually realized productization. In particular, in respect of intelligent speech dialogue products, as Amazon Echo smart speaker and Google Home smart speaker arose in foreign countries, there arises a popular trend of smart household products, especially smart speaker products, with dialogue as a main interaction manner.

A typical scenario of using intelligent speech dialogue products, including smart speakers, is at home. At home, users use speech to interact with the machine very naturally. There are usually a plurality of users in a family, and each user certainly has a different demand. However, current products provide very coarse service, and provide one set of same service for all users. The products respond to users' requests with the same set of answer of universal standard, so that users' personalized demands cannot be satisfied.

An advantage of speech dialogue is that it can record the user's voice. Everyone has his/her own voice, just like a fingerprint. Therefore, everyone's voice is also called a voiceprint. It is possible to, through the speaker's voiceprint, determine who the speaker is, and extract the user's data to provide a personalized service. At present, the voiceprint technology in the industry is immature and it is difficult to meet the requirements of productization.

In the prior art, there is a problem that the voiceprint creation and registration method has a high learning cost and is more disturbing to the user.

SUMMARY

A plurality of aspects of the present disclosure provide a method and an apparatus for voiceprint creation and registration, to provide personalized services to users and reduce learning costs.

According to an aspect of the present disclosure, there is provided a method for voiceprint creation and registration, the method includes:
prompting to create a voiceprint and register when a device is enabled for a first time;
using a text-related training method to create a voiceprint model for a user;
generating an ID for the user; and
storing the ID for the user and the voiceprint model correspondingly in a voiceprint registration database.

The above aspect and any possible implementation mode further provide an implementation mode: the using a text-related training method to create a voiceprint model for a user comprises the following sub-steps:
providing a registration character string to the user;
receiving speech information of the user reading the registration character string;
determining a gender tag for the user according to a gender classifier and speech; and
generating a voiceprint model for the user according to the gender tag and speech.

According to another aspect of the present disclosure, there is provided a method for voiceprint creation and registration, the method includes:
obtaining a speech request sent by a user;
identifying an ID for the user who sends the speech request according to the speech request and in a voiceprint recognition manner;
prompting to create a voiceprint and register, if an ID for the user is not identified;
generating an ID for the user;
storing the ID for the user and a voiceprint model correspondingly in a voiceprint registration database.

The above aspect and any possible implementation mode further provide an implementation mode: the obtaining a speech request sent by a user further comprises:
judging whether the speech request needs to be sent to a cloud; if yes, identifying an ID for the user who sends the speech request according to the speech request and in a voiceprint recognition manner.

The above aspect and any possible implementation mode further provide an implementation mode: the obtaining a speech request sent by a user further comprises:
judging whether the speech request needs to identify an ID for the user, and if yes, identifying an ID for the user who sends the speech request according to the speech request and in a voiceprint recognition manner.

The above aspect and any possible implementation mode further provide an implementation mode: the prompting to create a voiceprint and register comprises:
marking a voiceprint model for which an ID for a user is not identified, with an ID number;
judging a frequency of appearance of the voiceprint model marked with the ID number;
deleting the ID number if the frequency of appearance is lower than a threshold;
generating an ID for the user if the frequency of appearance is higher than the threshold; and
storing the ID for the user and the voiceprint model correspondingly in a voiceprint registration database.

The above aspect and any possible implementation mode further provide an implementation mode: the prompting to create a voiceprint and register comprises:
using a text-related training method to create the voiceprint model for the user whose ID is not identified.

The above aspect and any possible implementation mode further provide an implementation mode: the using a text-related training method to create the voiceprint model for the user whose ID is not identified comprises:

providing a registration character string to the user;

receiving speech information of the user reading the registration character string;

determining a gender tag for the user according to a gender classifier and speech; and generating the voiceprint model for the user according to the gender tag and speech.

According to a further aspect of the present disclosure, there is provided an apparatus for voiceprint creation and registration, the apparatus includes:

a prompting module, a voiceprint creation module, an input module, and a registration module; wherein, the prompting module is configured to prompt to create a voiceprint and register when a device is enabled for a first time;

the voiceprint creation module is configured to use a text-related training method to create a voiceprint model for a user;

the input module is configured to generate an ID for the user;

the registration module is configured to store the ID for the user and the voiceprint model correspondingly in a voiceprint registration database.

The above aspect and any possible implementation mode further provide an implementation mode: the voiceprint creation module specifically comprises the following sub-modules:

a provision sub-module configured to provide a registration character string to the user;

a reception sub-module configured to receive speech information of the user reading the registration character string;

a determination sub-module configured to determine a gender tag for the user according to a gender classifier and speech; and a generation sub-module configured to generate a voiceprint model for the user according to the gender tag and speech.

According to a further aspect of the present disclosure, there is provided an apparatus for voiceprint creation and registration, the apparatus includes:

an obtaining module, a voiceprint identifying module, a prompting module, an input module and a registration module; wherein, the obtaining module is configured to obtain a speech request sent by a user;

the voiceprint identifying module is configured to identify an ID for the user who sends the speech request according to the speech request and in a voiceprint recognition manner;

the promoting module is configured to prompt a user who is unregistered to create a voiceprint and register;

the input module is configured to generate an ID for the user;

the registration module is configured to store the ID for the user and a voiceprint model correspondingly in a voiceprint registration database.

The above aspect and any possible implementation mode further provide an implementation mode: the obtaining module specifically performs:

judging whether the speech request needs to be sent to a cloud; if yes, identifying an ID for the user who sends the speech request according to the speech request and in a voiceprint recognition manner.

The above aspect and any possible implementation mode further provide an implementation mode: the prompting module specifically performs:

judging whether the speech request needs to identify an ID for a user, and if yes, identifying the ID for the user who sends the speech request according to the speech request and in a voiceprint recognition manner.

The above aspect and any possible implementation mode further provide an implementation mode: the prompting module specifically performs:

marking the voiceprint model for which an ID for a user is not identified, with an ID number;

judging a frequency of appearance of the voiceprint model marked with the ID number;

deleting the ID number if the frequency of appearance is lower than a threshold;

generating an ID for the user if the frequency of appearance is higher than the threshold; and storing the ID for the user and the voiceprint model correspondingly in a voiceprint registration database.

The above aspect and any possible implementation mode further provide an implementation mode: the prompting module specifically performs:

using a text-related training method to create the voiceprint model for the user.

The above aspect and any possible implementation mode further provide an implementation mode: the prompting module comprises the following sub-modules:

a provision sub-module configured to provide a registration character string to the user;

a reception sub-module configured to receive speech information of the user reading the registration character string;

a determination sub-module configured to determine a gender tag for the user according to a gender classifier and speech; and a generation sub-module configured to generate the voiceprint model for the user according to the gender tag and speech.

According to a further aspect of the present disclosure, there is provided a device, including:

one or more processors;

a storage for storing one or more programs;

the one or more programs, when being executed by the one or more processors, enable the one or more processors to implement any of the abovementioned methods.

According to a further aspect of the present disclosure, there is provided a computer-readable storage medium on which a computer program is stored, the program, when executed by a processor, implementing any of the abovementioned methods.

As known from the above technical solutions, the embodiments of the present disclosure may avoid problems in the prior art such as extremely high dependence on the voiceprint recognition method technology, singular use policy and low degree of productization. The embodiments of the present disclosure may exhibit a higher technical error-tolerant rate, quicken the productization speed and may provide personalized services to users.

DETAILED DESCRIPTION OF EMBODIMENTS

To make objectives, technical solutions and advantages of the present disclosure clearer, the present disclosure will be described in detail with reference to the drawings and embodiments.

In addition, the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

For an intelligent speech interaction device, a MateAPP exists on the mobile phone terminal and cooperates with the intelligent speech interaction device to complete a series of tasks. In order to create a voiceprint, a "speech management" function module is created on MateAPP, in which the user may create, delete and modify the voiceprint under the account.

Figure 1:
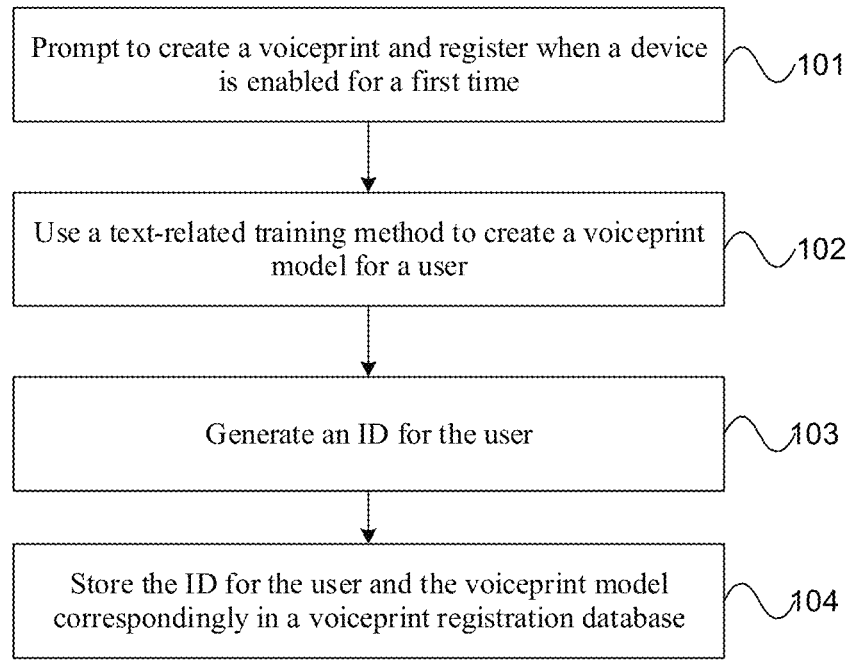
FIG. 1 is a schematic flowchart of a method for voiceprint creation and registration according to an embodiment of the present disclosure.

FIG. 1 is a schematic flowchart of a method for voiceprint creation and registration according to an embodiment of the present disclosure. As shown in FIG. 1, the method includes the following steps:

At 101, when a device is enabled for a first time, prompt to create a voiceprint and register;

When the device is powered on for the first time, the user is prompted to register at least one voiceprint ID through MateAPP, and confirm relevant identity information, such as name, age, gender, and the like.

The user creates a voiceprint through MateAPP or by speaking out a will to create a voiceprint.

Figure 2:
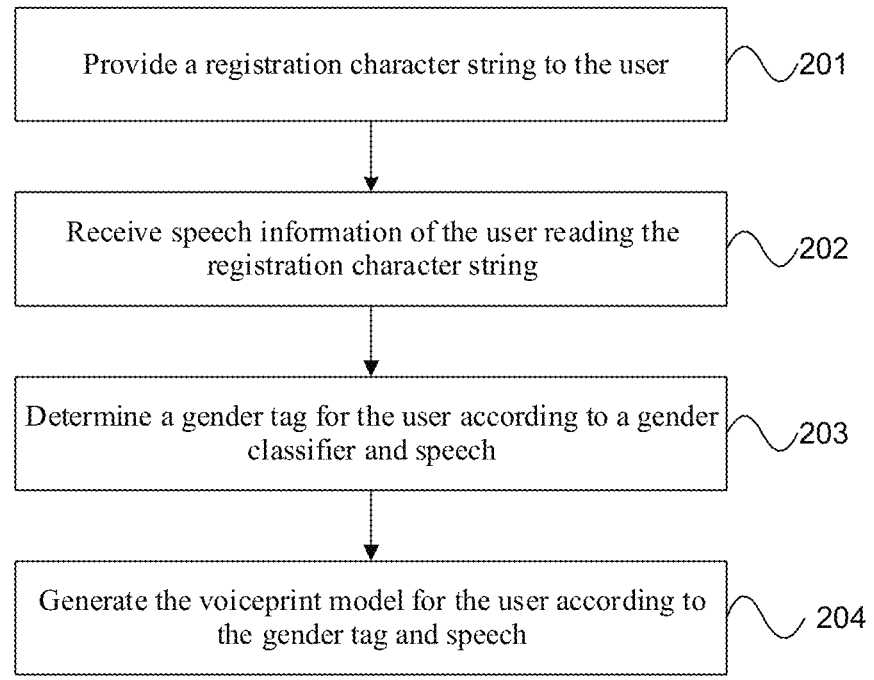
FIG. 2 is a schematic flowchart of using a text-related training method to create a voiceprint model for an unregistered user in a method for voiceprint creation and registration according to an embodiment of the present disclosure.

At 102, a text-related training method is used to create a voiceprint model for the user; specifically, as shown in FIG. 2, the following sub-steps are included:

At 201, a registration character string is provided to the user.

It may be understood that the registration character string may be in many forms:

As an example, the registration character string may be a randomly-generated string of numbers. In addition, to enable coverage of a larger sample space, the numbers in the registration character string appears only once.

As another example, the registration character string may be a randomly-generated Chinese character string.

At 202, speech information of the user reading the registration character string is received.

Specifically, after the registration character string is provided to the user, the user may read aloud the provided registration character string for multiple times to generate a plurality of speeches for registration. While the user reads the registration character string, or when the user finishes reading the registration character string, the speech information generated in a way that the user reads aloud the provided registration character string may be received.

In 203, a gender tag for the user is determined based on a gender classifier and speech.

In an embodiment of the present disclosure, the speech may be gender-classified according to the gender classifier to obtain the user's gender tag. The gender tag includes male or female. Specifically, a first feature information of the obtained speech is extracted, and the first feature information is sent to a pre-generated gender classifier. The gender classifier analyzes the first feature information, and obtains a gender tag for the first feature information, that is, the gender tag for the user.

For example, taking a Gaussian mixture model as an example of a gender classification model, a fundamental frequency feature and a Mel frequency cepstral coefficient MFCC feature may be extracted with respect to the speech first, then a posterior probability value may be calculated for the fundamental frequency feature and the MFCC feature based on the Gaussian mixture model, and the user's gender is determined according to a calculation result. For example, assuming that the Gaussian mixture model is a male Gaussian mixture model, when the calculation result is that the posterior probability value is very high, for example, greater than a certain threshold, it may be determined that the user's gender is male; when the calculation result is that the posterior probability value is very small, for example, less than a certain threshold, it may be determined that the user's gender is female.

At 204, a voiceprint model for the user is generated based on the gender tag and speech.

A posterior probability of each speech is obtained according to a DNN model corresponding to the gender tag.

A second feature vector of each speech is extracted respectively according to a unified background model and a feature vector extraction model corresponding to the gender tag.

The voiceprint model for the user is obtained according to a plurality of second feature vectors corresponding to the plurality of speeches.

Specifically, the plurality of speeches input by the user are sent to the DNN model corresponding to the gender, according to the gender tag returned by the gender classifier and corresponding to the speeches. That is, if the speeches correspond to male speeches, the speeches are sent to a male DNN model. If the speeches correspond to female speeches, the speeches are sent to a female DNN model.

A plurality of posterior probabilities corresponding to each speech are obtained according to the DNN model corresponding to the gender tag.

Each posterior probability is normalized according to a unified background model corresponding to the gender tag, and a pre-trained feature vector extraction model is applied to respectively extract the second feature vector of each speech according to each speech and the corresponding normalized posterior probability.

The voiceprint model for the user is obtained according to the plurality of second feature vectors corresponding to the plurality of speeches. There are many obtaining manners, which may be selected according to different application needs, for example:

obtaining an average feature vector of the plurality of second feature vectors as the voiceprint model for the user.

At 103, an ID for the user is generated, and the user is prompted to input user ID-related data such as name, gender, age, hobby, home address, and workplace address.

At 104, the ID for the user and the voiceprint model are correspondingly stored under a certain account of a voiceprint registration database, so that voiceprint recognition is performed subsequently according to the voiceprint model, and speech control is performed on any intelligent speech device under the account.

The pre-stored voiceprint model is associated with the same account, for example, a Baidu account, and all the voiceprints under the account form a set. Each intelligent speech interaction device and the account are uniquely bound, and the intelligent speech interaction device is associated with the voiceprint through the account. The voiceprint may be registered through any device under the account. Once registered, it may be used in any intelligent speech device under the account. When the device under a certain account captures a voiceprint, it matches the voiceprint with a family voiceprint set under the same account, and recognizes the voiceprint ID, thereby achieving the unification of the three, and realizing the end-to-end voiceprint set identification solution.

Figure 3:
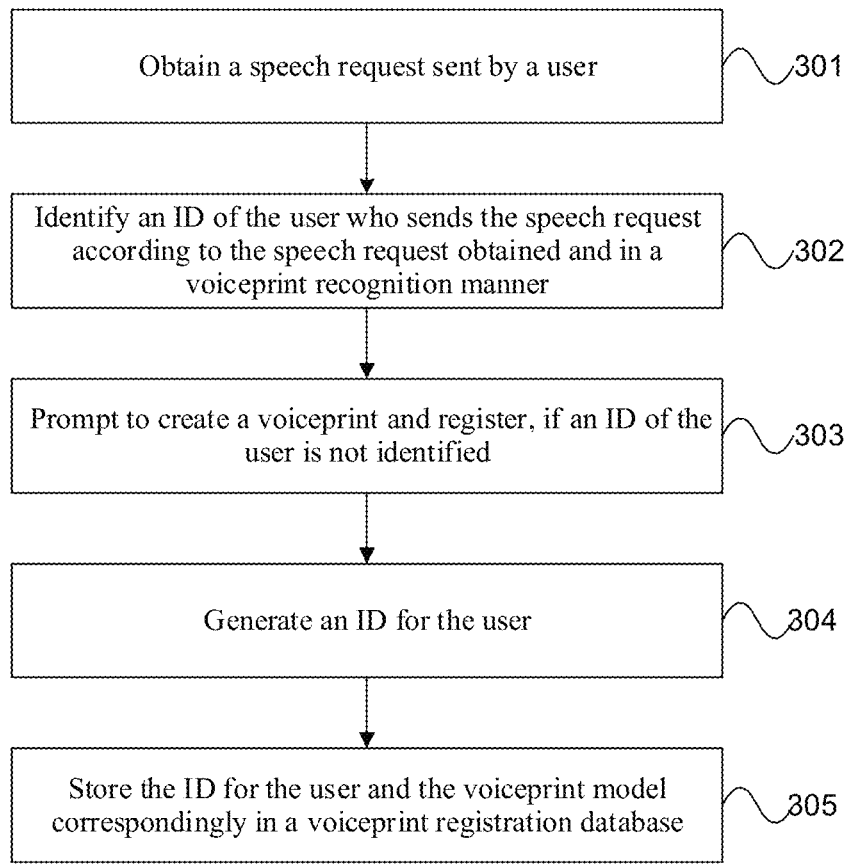
FIG. 3 is a schematic flowchart of a method for voiceprint creation and registration according to another embodiment of the present disclosure.

FIG. 3 is a schematic flowchart of a method for voiceprint creation and registration according to another embodiment of the present disclosure. As shown in FIG. 3, the method includes the following steps:

At 301, a speech request sent by a user is obtained;

In an implementation mode of the embodiment, after the intelligent speech interaction device is connected to the network, the user performs speech interaction with the intelligent speech interaction device, it is judged whether the speech request needs to be sent to a cloud; if yes, an ID for the user who sends the speech request is further identified.

In another implementation mode of the embodiment, speech recognition is first performed for the speech request, a command described by a command speech is obtained, and a vertical class corresponding to the command is determined; if the vertical class does not need to determine an ID for the user to provide a personalized recommendation, the speech request is directly responded to; if the vertical class needs to determine the ID for the user to provide a personalized recommendation, the ID for the user who sends the speech request is further identified.

Figure 4:
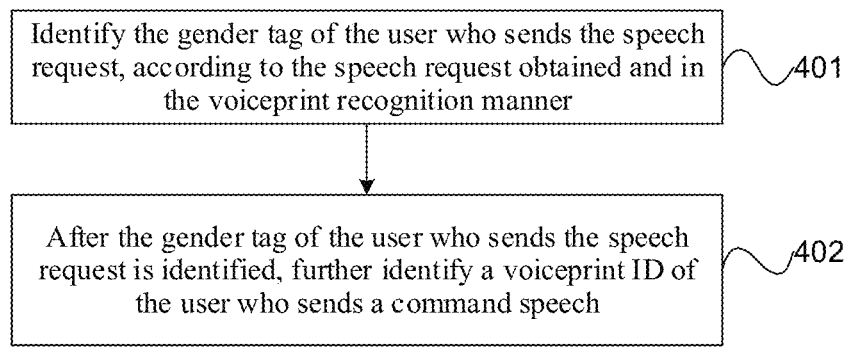
FIG. 4 is a schematic flowchart of identifying an ID for a user who sends a speech request according to the speech request by employing a voiceprint recognition manner in a method for voiceprint creation and registration according to another embodiment of the present disclosure.

At 302, the ID for the user who sends the speech request is identified according to the speech request and in a voiceprint recognition manner; specifically, as shown in FIG. 4, the following sub-steps are included:

At 401, a gender tag for the user who sends the speech request is identified according to the speech request and in the voiceprint recognition manner.

Since user groups of different genders have special voiceprint features, model training may be performed according to the speech characteristics of the user group to realize voiceprint analysis for user groups of different genders. When the user initiates a speech request, the gender information of the user who sends the speech request is identified according to the speech request sent by the user and in the voiceprint recognition manner.

Before the voiceprint recognition, the voiceprint of the speaker needs to be modeled, that is, "trained" or "learnt". Specifically, a first feature vector of each speech in a training set is extracted by applying a deep neural network DNN voiceprint baseline system; and the gender classifier is trained according to the first feature vector of each speech and the pre-annotated gender tag. Thus, a gender-based voiceprint processing model is built.

The first feature information of the command speech is extracted according to the obtained command speech, and the first feature information is sent to a pre-generated gender classifier. The gender classifier analyzes the first feature information, and obtains a gender tag of the first feature information, namely, the gender tag of the command speech.

For example, taking the Gaussian mixture model as an example of the gender classifier, a fundamental frequency feature and a Mel frequency cepstral coefficient MFCC feature may be extracted with respect to the speech request first, then a posterior probability value may be calculated for the fundamental frequency feature and the MFCC feature based on the Gaussian mixture model, and the user's gender is determined according to a calculation result. For example, assuming that the Gaussian mixture model is a male Gaussian mixture model, when the calculation result is that the posterior probability value is very high, for example, greater than a certain threshold, it may be determined that the user's gender is male; when the calculation result is that the posterior probability value is very small, for example, less than a certain threshold, it may be determined that the user's gender is female.

At 402, after the gender tag for the user who sends the speech request is identified, a voiceprint ID for the user who sends the command speech is further identified.

The voice of each user will have a unique voiceprint ID that records the user's personal data such as name, gender, age and hobbies.

Specifically, the speech input by the user is sent to the DNN model corresponding to the gender, according to the gender tag returned by the gender classifier and corresponding to the speech request. That is, if the speech request corresponds to a male speech, the speech is sent to a male DNN model. If the speech request corresponds to a female speech, the speech is sent to a female DNN model.

A plurality of posterior probabilities corresponding to the speech request are obtained according to the DNN model corresponding to the gender tag.

Each posterior probability is normalized according to a unified background model corresponding to the gender tag, and a pre-trained feature vector extraction model is applied to respectively extract the second feature vector of each speech according to each speech and the corresponding normalized posterior probability.

The voiceprint model for the user is obtained according to the plurality of second feature vectors corresponding to the plurality of speeches. There are many obtaining manners, which may be selected according to different application needs, for example:

obtaining an average feature vector of the plurality of second feature vectors as the voiceprint model for the user.

The obtained voiceprint model for the user is matched with a pre-stored voiceprint model. If a matching value is less than a preset threshold, it is determined that the user has not yet performed registration and the user uses the smart device for the first time, and step 303 is performed.

At 303, if an ID for the user is not identified, a prompt is given to create a voiceprint and register;

In an implementation mode of the embodiment, if an ID for the user is not identified, a non-text-related training method is employed to build a voiceprint model for the unregistered user and register.

Specifically, the obtained voiceprint model of the unregistered user is marked with an ID number;

An ID for the user is generated, and the user is prompted to input user ID-related data such as name, gender, age, hobby, home address, workplace address, and register the voiceprint.

The ID for the user and the voiceprint model are correspondingly stored under a certain account of a voiceprint registration database, so that voiceprint recognition is performed subsequently according to the voiceprint model, and speech control is performed on any intelligent speech device under the account.

In another implementation mode of the embodiment, to minimize users' disturbance, it is possible to only guide frequently-using family users to create the voiceprint. Specifically, The voiceprint model for which an ID for a user is not identified is marked with an ID number; but an ID for the user is not generated to prompt the user to input user ID-related data such as name, gender, age, hobbies, home address, workplace address; only the behavior of the user to which the ID number belongs to is recorded in the background.

A frequency of appearance of the voiceprint model marked with the ID number is judged;

If the voiceprint appears at a low frequency, the ID number is automatically deleted;

If the voiceprint appears at a high frequency or appears for several consecutive days, an ID for the user is generated, prompting the user to input user ID-related data such as name, gender, age, hobby, home address and workplace address and register the voiceprint. The ID for the user and the voiceprint model are correspondingly stored under a certain account of a voiceprint registration database, so that voiceprint recognition is performed subsequently according to the voiceprint model, and speech control is performed on any intelligent speech device under the account.

In an implementation mode of the embodiment, a text-related training method is employed to build a voiceprint model for a user whose ID is not identified; under the case that the voiceprint technology is not perfect, the text-related training method may be used to improve a recognition rate.

Figure 5:
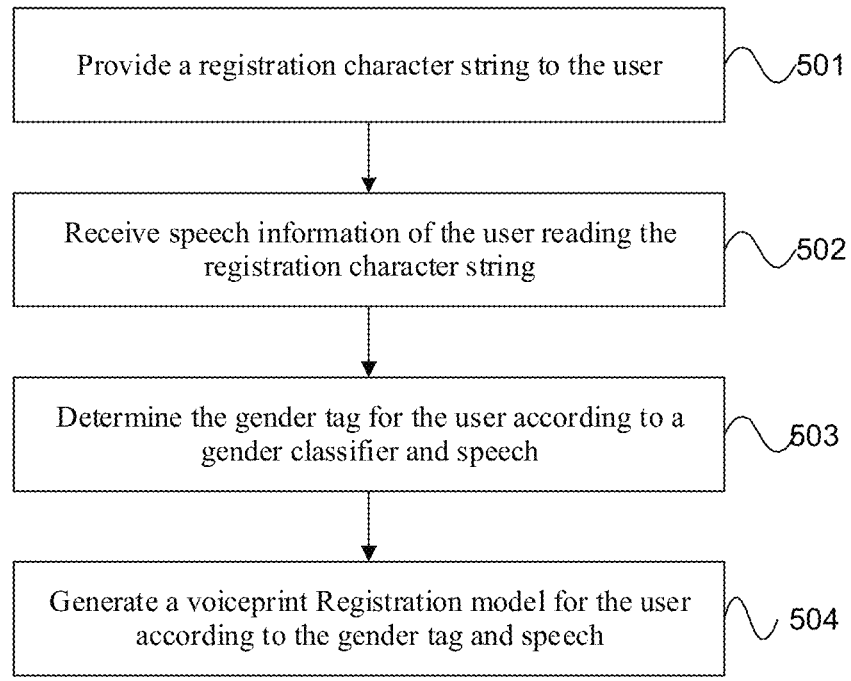
FIG. 5 is a schematic flowchart of prompting an unregistered user to create and register a voiceprint in a method for voiceprint creation and registration according to another embodiment of the present disclosure.

Specifically, as shown in FIG. 5, using the text-related training method to build a voiceprint model for the user whose ID is not identified includes the following sub-steps:

At 501, a registration character string is provided to the user.

It may be understood that the registration character string may be in many forms:

As an example, the registration character string may be a randomly-generated string of numbers. In addition, to enable coverage of a larger sample space, the numbers in the registration character string appears only once.

As another example, the registration character string may be a randomly-generated Chinese character string.

At 502, speech information of the user reading the registration character string is received.

Specifically, after the registration character string is provided to the user, the user may read aloud the provided registration character string for multiple times to register. While the user reads the registration character string, or when the user finishes reading the registration character string, the speech information generated in a way that the user reads aloud the provided registration character string may be received.

In 503, the user's gender tag is determined based on a gender classifier and speech.

In an embodiment of the present disclosure, the speech may be gender-classified according to the gender classifier to obtain the user's gender tag. The gender tag includes male or female. Specifically, a first feature information of the obtained speech is extracted, and the first feature information is sent to a pre-generated gender classifier. The gender classifier analyzes the first feature information, and obtains a gender tag of the first feature information, that is, the user's gender tag.

For example, taking a Gaussian mixture model as an example of a gender classification model, a fundamental frequency feature and a Mel frequency cepstral coefficient MFCC feature may be extracted with respect to the speech first, then a posterior probability value may be calculated for the fundamental frequency feature and the MFCC feature based on the Gaussian mixture model, and the user's gender is determined according to a calculation result. For example, assuming that the Gaussian mixture model is a male Gaussian mixture model, when the calculation result is that the posterior probability value is very high, for example, greater than a certain threshold, it may be determined that the user's gender is male; when the calculation result is that the posterior probability value is very small, for example, less than a certain threshold, it may be determined that the user's gender is female.

At 504, a voiceprint model for the user is generated based on the gender tag and speech.

A posterior probability of each speech is obtained according to a DNN model corresponding to the gender tag.

A second feature vector of each speech is extracted respectively according to a unified background model and a feature vector extraction model corresponding to the gender tag.

The voiceprint model for the user is obtained according to a plurality of second feature vectors corresponding to the plurality of speeches.

Specifically, the plurality of speeches input by the user are sent to a DNN model corresponding to the gender, according to the gender tag returned by the gender classifier and corresponding to the speeches. That is, if the speeches correspond to a male speeches, the speeches are sent to a male DNN model. If the speeches correspond to female speeches, the speeches are sent to a female DNN model.

A plurality of posterior probabilities corresponding to each speech are obtained according to the DNN model corresponding to the gender tag.

Each posterior probability is normalized according to a unified background model corresponding to the gender tag, and a pre-trained feature vector extraction model is applied to respectively extract the second feature vector of each speech according to each speech and the corresponding normalized posterior probability.

The voiceprint model for the user is obtained according to the plurality of second feature vectors corresponding to the plurality of speeches. There are many obtaining manners, which may be selected according to different application needs, for example:

obtaining an average feature vector of the plurality of second feature vectors as the voiceprint model for the user.

At 304, an ID for the user is generated, and the user is prompted to input user ID-related data such as name, gender, age, hobby, home address and workplace address.

At 305, the ID for the user and the voiceprint model are correspondingly stored under a certain account of a voiceprint registration database, so that voiceprint recognition is performed subsequently according to the voiceprint model, and speech control is performed on any intelligent speech device under the account.

The pre-stored voiceprint model is associated with the same account, for example, a Baidu account, and all the voiceprints under the account form a set. Each intelligent speech interaction device and the account are uniquely bound, and the intelligent speech interaction device is associated with the voiceprint through the account. The voiceprint may be registered through any device under the account. Once registered, it may be used in any intelligent speech device under the account. When the device under a certain account captures a voiceprint, it matches the voiceprint with a family voiceprint set under the same account, and recognizes the voiceprint ID, thereby achieving the unification of the three, and realizing the end-to-end voiceprint set identification solution.

Preferably, the user may log in with a speech through the MateAPP and modify the ID for the user and the voiceprint model.

The method in the embodiment may avoid the problems in the prior art that the technology of the method for voiceprint creation and registration has a high learning cost and is more disturbing to the user. The gender-based voiceprint registration process is implemented, so that a gender-specific voiceprint authentication processing model is applied to improve the efficiency and accuracy of voiceprint authentication; the voiceprint creation process can cover various scenes, the voiceprint creation may guide the user in all stages, or the voiceprint creation is separated from registration through a frequency to minimize user's disturbance, and after the user is guided to register the voiceprint, the speech interaction product may provide personalized service to the user based on the voiceprint.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

Figure 6:
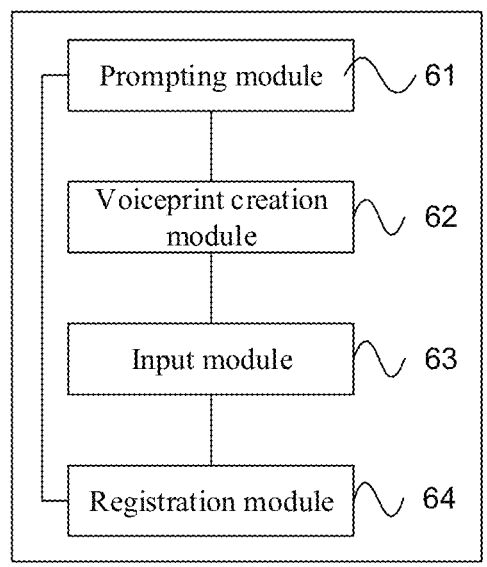
FIG. 6 is a schematic structural diagram of an apparatus for voiceprint creation and registration according to another embodiment of the present disclosure.

FIG. 6 is a schematic structural diagram of an apparatus for voiceprint creation and registration according to another embodiment of the present disclosure. As shown in FIG. 6, the apparatus includes a prompting module 61, a voiceprint creation module 62, an input module 63, and a registration module 64, and The prompting module 61 is configured to prompt to create a voiceprint and register when a device is enabled for the first time;

When the device is powered on for the first time, the user is guided to register at least one voiceprint ID through MateAPP, and confirm relevant identity information, such as name, age, gender, and the like.

The user creates a voiceprint through MateAPP or by speaking out a will to create a voiceprint.

Figure 7:
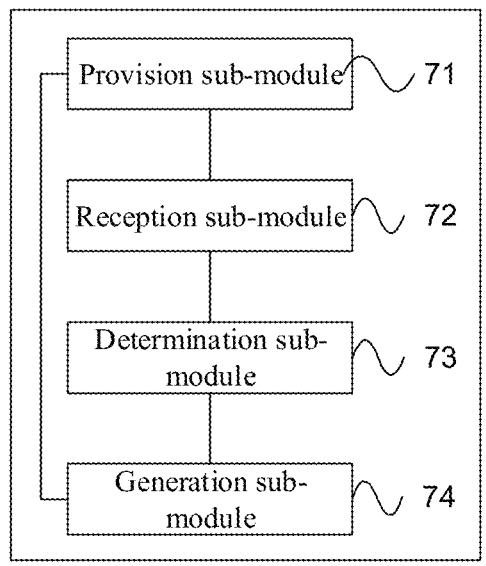
FIG. 7 is a schematic structural diagram of a voiceprint creating module of an apparatus for voiceprint creation and registration according to an embodiment of the present disclosure.

The voiceprint creation module 62 is configured to use a text-related training method to create a voiceprint model for the user; specifically, as shown in FIG. 7, the voiceprint creation module comprises the following sub-modules:

a provision sub-module 71 configured to provide a registration character string to the user.

It may be understood that the registration character string may be in many forms:

As an example, the registration character string may be a randomly-generated string of numbers. In addition, to enable coverage of a larger sample space, the numbers in the registration character string appears only once.

As another example, the registration character string may be a randomly-generated Chinese character string.

A reception sub-module 72 configured to receive speech information of the user reading the registration character string.

Specifically, after the registration character string is provided to the user, the user may read aloud the provided registration character string for multiple times to generate a plurality of speeches for registration. While the user reads the registration character string, or when the user finishes reading the registration character string, the speech information generated in a way that the user reads aloud the provided registration character string may be received.

A determination sub-module 73 configured to determine the user's gender tag based on a gender classifier and speech.

In an embodiment of the present disclosure, the speech may be gender-classified according to the gender classifier to obtain the user's gender tag. The gender tag includes male or female. Specifically, a first feature information of the obtained speech is extracted, and the first feature information is sent to a pre-generated gender classifier. The gender classifier analyzes the first feature information, and obtains a gender tag of the first feature information, that is, the user's gender tag.

For example, taking a Gaussian mixture model as an example of a gender classification model, a fundamental frequency feature and a Mel frequency cepstral coefficient MFCC feature may be extracted with respect to the speech first, then a posterior probability value may be calculated for the fundamental frequency feature and the MFCC feature based on the Gaussian mixture model, and the user's gender is determined according to a calculation result. For example, assuming that the Gaussian mixture model is a male Gaussian mixture model, when the calculation result is that the posterior probability value is very high, for example, greater than a certain threshold, it may be determined that the user's gender is male; when the calculation result is that the posterior probability value is very small, for example, less than a certain threshold, it may be determined that the user's gender is female.

A generation sub-module 74 configured to generate a voiceprint model for the user based on the gender tag and speech.

A posterior probability of each speech is obtained according to a DNN model corresponding to the gender tag.

A second feature vector of each speech is extracted respectively according to a unified background model and a feature vector extraction model corresponding to the gender tag.

The voiceprint model for the user is obtained according to a plurality of second feature vectors corresponding to the plurality of speeches.

Specifically, the plurality of speeches input by the user are sent to the DNN model corresponding to the gender, according to the gender tag returned by the gender classifier and corresponding to the speeches. That is, if the speeches correspond to male speeches, the speeches are sent to a male DNN model. If the speeches correspond to female speeches, the speeches are sent to a female DNN model.

A plurality of posterior probabilities corresponding to each speech are obtained according to the DNN model corresponding to the gender tag.

Each posterior probability is normalized according to a unified background model corresponding to the gender tag, and a pre-trained feature vector extraction model is applied to respectively extract the second feature vector of each speech according to each speech and the corresponding normalized posterior probability.

The voiceprint model for the user is obtained according to the plurality of second feature vectors corresponding to the plurality of speeches. There are many obtaining manners, which may be selected according to different application needs, for example:

obtaining an average feature vector of the plurality of second feature vectors as the voiceprint model for the user.

The input module 63 is configured to generate an ID for the user and prompt the user to input user ID-related data such as name, gender, age, hobby, home address, and workplace address.

The registration module 64 is configured to store the ID for the user and the voiceprint model correspondingly under a certain account of a voiceprint registration database, so that voiceprint recognition is performed subsequently according to the voiceprint model, and speech control is performed on any intelligent speech device under the account.

The pre-stored voiceprint model is associated with the same account, for example, a Baidu account, and all the voiceprints under the account form a set. Each intelligent speech interaction device and the account are uniquely bound, and the intelligent speech interaction device is associated with the voiceprint through the account. The voiceprint may be registered through any device under the account. Once registered, it may be used in any intelligent speech device under the account. When the device under a certain account captures a voiceprint, it matches the voiceprint with a family voiceprint set under the same account, and recognizes the voiceprint ID, thereby achieving the unification of the three, and realizing the end-to-end voiceprint set identification solution.

Figure 8:
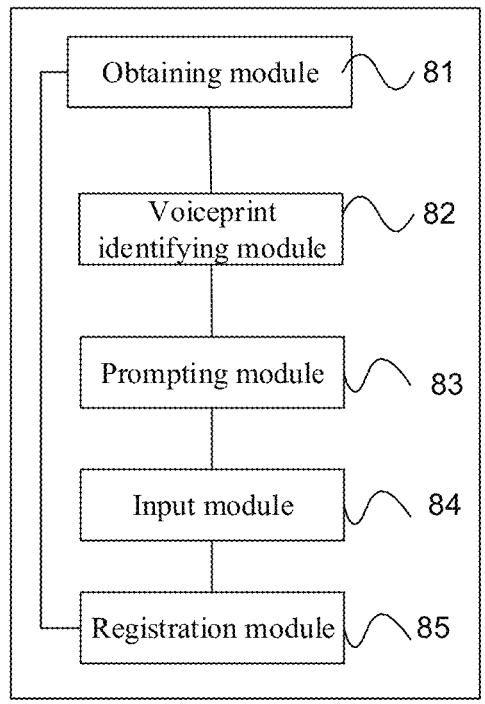
FIG. 8 is a schematic structural diagram of an apparatus for voiceprint creation and registration according to another embodiment of the present disclosure.

FIG. 8 is a schematic structural diagram of an apparatus for voiceprint creation and registration according to another embodiment of the present disclosure. As shown in FIG. 8, the apparatus comprises:

an obtaining module 81 configured to obtain a speech request sent by a user;

In an implementation mode of the embodiment, after the intelligent speech interaction device is connected to the network, the user performs speech interaction with the intelligent speech interaction device, and it is judged whether the speech request needs to be sent to the cloud; if yes, the ID for the user who sends the speech request is further identified.

In another implementation mode of the embodiment, speech recognition is first performed for the speech request, a command described by the command speech is obtained, and a vertical class corresponding to the command is determined; if the vertical class does not need to determine the ID for the user to provide a personalized recommendation, the speech request is directly responded to; if the vertical class needs to determine the ID for the user to provide a personalized recommendation, the ID for the user who sends the speech request is further identified.

A voiceprint identifying module 82 is configured to identify the ID for the user who sends the speech request according to the speech request and in a voiceprint recognition manner; specifically, the voiceprint identifying module comprises the following sub-modules:

a user gender identifying sub-module configured to identify the gender tag of the user who sends the speech request according to the speech request and in the voiceprint recognition manner.

Since user groups of different genders have special voiceprint features, model training may be performed according to the speech characteristics of the user groups to realize voiceprint analysis for user groups of different genders. When the user initiates a speech request, the gender information of the user who sends the speech request is identified according to the user-sent speech request and in the voiceprint recognition manner.

Before the voiceprint recognition, the voiceprint of the speaker needs to be modeled, that is, "trained" or "learnt". Specifically, the first feature vector of each speech in a training set is extracted by applying a deep neural network DNN voiceprint baseline system; and the gender classifier is trained according to the first feature vector of each speech and the pre-annotated gender tag. Thus, a gender-based voiceprint processing model is built.

The first feature information of the command speech is extracted according to the obtained command speech, and the first feature information is sent to a pre-generated gender classifier. The gender classifier analyzes the first feature information, and obtains a gender tag of the first feature information, namely, the gender tag of the command speech.

For example, taking the Gaussian mixture model as an example of the gender classifier, a fundamental frequency feature and a Mel frequency cepstral coefficient MFCC feature may be extracted with respect to the speech request first, then a posterior probability value may be calculated for the fundamental frequency feature and the MFCC feature based on the Gaussian mixture model, and the user's gender is determined according to a calculation result. For example, assuming that the Gaussian mixture model is a male Gaussian mixture model, when the calculation result is that the posterior probability value is very high, for example, greater than a certain threshold, it may be determined that the user's gender is male; when the calculation result is that the posterior probability value is very small, for example, less than a certain threshold, it may be determined that the user's gender is female.

A user voiceprint ID identifying sub-module is configured to further identify a voiceprint ID for the user who sends the command speech, after the gender tag of the user who sends the speech request is identified.

The voice of each user will have a unique voiceprint ID that records the user's personal data such as name, gender, age and hobbies.

Specifically, the speech input by the user is sent to the DNN model corresponding to the gender, according to the gender tag returned by the gender classifier and corresponding to the speech request. That is, if the speech request corresponds to a male speech, the speech is sent to a male DNN model. If the speech request corresponds to a female speech, the speech is sent to a female DNN model.

A plurality of posterior probabilities corresponding to the speech request are obtained according to the DNN model corresponding to the gender tag.

Each posterior probability is normalized according to a unified background model corresponding to the gender tag, and a pre-trained feature vector extraction model is applied to respectively extract the second feature vector of each speech according to each speech and the corresponding normalized posterior probability.

The voiceprint model for the user is obtained according to the plurality of second feature vectors corresponding to the plurality of speeches. There are many obtaining manners, which may be selected according to different application needs, for example:

obtaining an average feature vector of the plurality of second feature vectors as the voiceprint model for the user.

The obtained voiceprint model for the user is matched with a pre-stored voiceprint model. If a matching value is less than a preset threshold, it is determined that the user has not yet performed registration and the user uses the smart device for the first time.

A promoting module 83 is configured to prompt to create a voiceprint and register if the ID for user is not identified;

In an implementation mode of the embodiment, if the ID for user is not identified and the user uses the smart device for the first time, the prompting module 83 employs a non-text-related training method to build a voiceprint model for the user.

Specifically, the voiceprint model for which the ID for the user is not identified is marked with an ID number;

An ID for the user is generated, and the user is prompted to input user ID-related data such as name, gender, age, hobby, home address, workplace address, and register the voiceprint.

The ID for the user and the voiceprint model are correspondingly stored under a certain account of a voiceprint registration database, so that voiceprint recognition is performed subsequently according to the voiceprint model, and speech control is performed on any intelligent speech device under the account.

In another implementation mode of the embodiment, to minimize users' disturbance, it is possible to only guide frequently-using family users to create the voiceprint. Specifically:

The voiceprint model for which the ID for the user is not identified is marked with an ID number; but the ID for the user is not generated to prompt the user to input user ID-related data such as name, gender, age, hobbies, home address, workplace address; only the behavior of the user to which the ID number belongs to is recorded in the background.

A frequency of appearance of the voiceprint model marked with the ID number is judged;

If the voiceprint appears at a low frequency, the ID number is automatically deleted;

If the voiceprint appears at a high frequency or appears for several consecutive days, the ID for the user is generated, and the user is prompted to input user ID-related data such as name, gender, age, hobby, home address and workplace address. The ID for the user and the voiceprint model are correspondingly stored under a certain account of a voiceprint registration database, so that voiceprint recognition is performed subsequently according to the voiceprint model, and speech control is performed on any intelligent speech device under the account.

Figure 9:
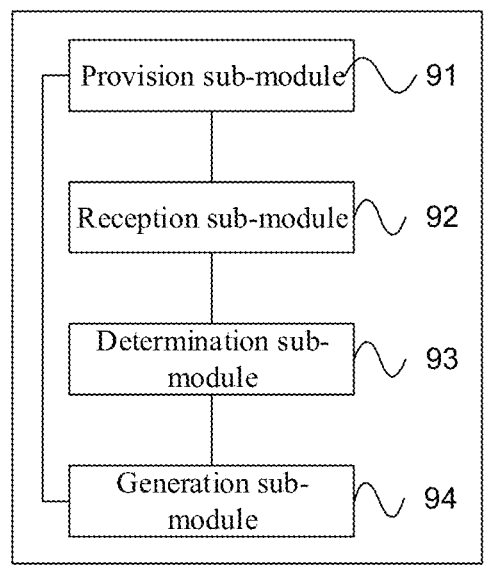
FIG. 9 is a schematic structural diagram of a prompting module of an apparatus for voiceprint creation and registration according to another embodiment of the present disclosure.

In an implementation mode of the embodiment, the prompting module 83 uses a text-related training method to build a voiceprint model for a user whose ID is not identified; in the case that the voiceprint technology is not perfect, the text-related training method may be used to improve a recognition rate. Specifically, as shown in FIG. 9, the module comprises the following sub-modules:

a provision sub-module 91 configured to provide a registration character string to the user.

It may be understood that the registration character string may be in many forms:

As an example, the registration character string may be a randomly-generated string of numbers. In addition, to enable coverage of a larger sample space, the numbers in the registration character string appears only once.

As another example, the registration character string may be a randomly-generated Chinese character string.

A reception sub-module 92 configured to receive speech information of the user reading the registration character string.

Specifically, after the registration character string is provided to the user, the user may read aloud the provided registration character string for multiple times to register. While the user reads the registration character string, or when the user finishes reading the registration character string, the speech information generated in a way that the user reads aloud the provided registration character string may be received.

A determination sub-module 93 configured to determine the user's gender tag based on a gender classifier and speech.

In an embodiment of the present disclosure, the speech may be gender-classified according to the gender classifier to obtain the user's gender tag. The gender tag includes male or female. Specifically, a first feature information of the obtained speech is extracted, and the first feature information is sent to a pre-generated gender classifier. The gender classifier analyzes the first feature information, and obtains a gender tag of the first feature information, that is, the user's gender tag.

For example, taking a Gaussian mixture model as an example of a gender classification model, a fundamental frequency feature and a Mel frequency cepstral coefficient MFCC feature may be extracted with respect to the speech first, then a posterior probability value may be calculated for the fundamental frequency feature and the MFCC feature based on the Gaussian mixture model, and the user's gender is determined according to a calculation result. For example, assuming that the Gaussian mixture model is a male Gaussian mixture model, when the calculation result is that the posterior probability value is very high, for example, greater than a certain threshold, it may be determined that the user's gender is male; when the calculation result is that the posterior probability value is very small, for example, less than a certain threshold, it may be determined that the user's gender is female.

A generation sub-module 94 configured to generate a voiceprint model for the user according to the gender tag and speech.

A posterior probability of each speech is obtained according to a DNN model corresponding to the gender tag.

A second feature vector of each speech is extracted respectively according to a unified background model and a feature vector extraction model corresponding to the gender tag.

The voiceprint model for the user is obtained according to a plurality of second feature vectors corresponding to the plurality of speeches.

Specifically, the plurality of speeches input by the user are sent to a DNN model corresponding to the gender, according to the gender tag returned by the gender classifier and corresponding to the speeches. That is, if the speeches correspond to male speeches, the speeches are sent to a male DNN model. If the speeches correspond to female speeches, the speeches are sent to a female DNN model.

A plurality of posterior probabilities corresponding to each speech are obtained according to the DNN model corresponding to the gender tag.

Each posterior probability is normalized according to a unified background model corresponding to the gender tag, and a pre-trained feature vector extraction model is applied to respectively extract the second feature vector of each speech according to each speech and the corresponding normalized posterior probability.

The voiceprint model for the user is obtained according to the plurality of second feature vectors corresponding to the plurality of speeches. There are many obtaining manners, which may be selected according to different application needs, for example:

obtaining an average feature vector of the plurality of second feature vectors as the voiceprint model for the user.

An input module 84 configured to generate an ID for the user and prompt the user to input user ID-related data such as name, gender, age, hobby, home address and workplace address.

A registration module 85 configured to store the ID for the user and the voiceprint model correspondingly under a certain account of a voiceprint registration database, so that voiceprint recognition is performed subsequently according to the voiceprint model, and speech control is performed on any intelligent speech device under the account.

The pre-stored voiceprint model is associated with the same account, for example, a Baidu account, and all the voiceprints under the account form a set. Each intelligent speech interaction device and the account are uniquely bound, and the intelligent speech interaction device is associated with the voiceprint through the account. The voiceprint may be registered through any device under the account. Once registered, it may be used in any intelligent speech device under the account. When the device under a certain account captures a voiceprint, it matches the voiceprint with a family voiceprint set under the same account, and recognizes the voiceprint ID, thereby achieving the unification of the three, and realizing the end-to-end voiceprint set identification solution.

Preferably, the user may log in with a speech through the MateAPP and modify the ID for the user and the voiceprint model.

The method in the embodiment may avoid the problems in the prior art that the technology of the method for voiceprint creation and registration has a high learning cost and is more disturbing to the user. The gender-based voiceprint registration process is implemented, so that a gender-specific voiceprint authentication processing model is applied to improve the efficiency and accuracy of voiceprint authentication; the voiceprint creation process can cover various scenes, the voiceprint creation may guide the user in all stages, or the voiceprint creation is separated from registration through a frequency to minimize user's disturbance, and after the user is guided to register the voiceprint, the speech interaction product may provide personalized service to the user based on the voiceprint.

A person skilled in the art may clearly understand that, for the convenience and brevity of the description, the specific working process of the described terminal and the server may be referred to the corresponding process in the foregoing method embodiments, and details are not described herein.

The apparatus in the embodiment may avoid the problems in the prior art that the technology of the voiceprint creation and registration method has a high learning cost and is more disturbing to the user. As such, the voiceprint creation process can cover various scenes, the voiceprint creation may guide the user in all stages, or the voiceprint creation is separated from registration through a frequency to minimize user's disturbance, and after the user is guided to register the voiceprint, the speech interaction product may provide personalized service to the user based on the voiceprint.

In the embodiments provided by the present disclosure, it should be understood that the revealed method and apparatus can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

Figure 10:
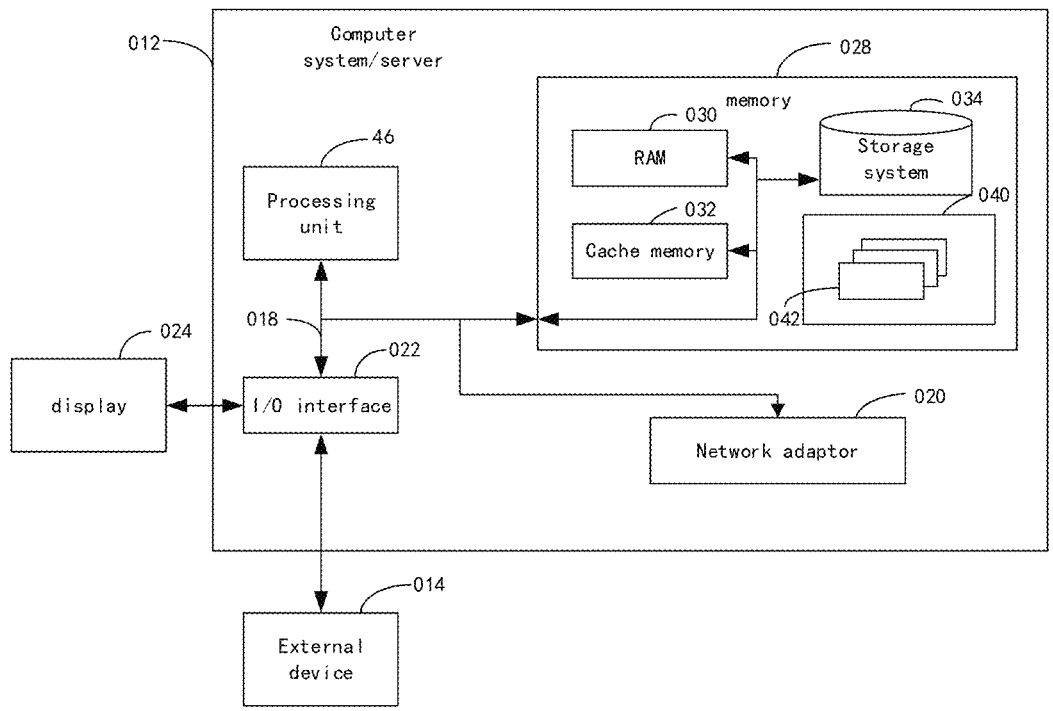
FIG. 10 is a block diagram of an exemplary computer system/server adapted to implement embodiments of the present disclosure.

FIG. 10 illustrates a block diagram of an example computer system/server 012 adapted to implement an implementation mode of the present disclosure. The computer system/server 012 shown in FIG. 10 is only an example and should not bring about any limitation to the function and scope of use of the embodiments of the present disclosure.

As shown in FIG. 10, the computer system/server 012 is shown in the form of a general-purpose computing device. The components of computer system/server 012 may include, but are not limited to, one or more processors or processing units 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA)

bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 10 and typically called a "hard drive"). Although not shown in FIG. 10, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc.; with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via network adapter 020. As depicted in the figure, the network adapter 020 communicates with the other communication modules of computer system/server 012 via bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the memory 028, for example, implement functions and/or methods in embodiments described in the present disclosure.

The aforesaid computer program may be arranged in the computer storage medium, namely, the computer storage medium is encoded with the computer program. The computer program, when executed by one or more computers, enables one or more computers to execute the flow of the method and/or operations of the apparatus as shown in the above embodiments of the present disclosure.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electro-magnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

A computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for voiceprint creation and registration, wherein the method comprises:
   obtaining a speech request sent by a user;
   identifying an ID for the user who sends the speech request according to the speech request and in a voiceprint recognition manner;
   marking a voiceprint model for which an ID for a user is not identified, with an ID number;
   deleting the ID number if the frequency of appearance of the voiceprint model marked with the ID number is lower than a threshold;
   prompting to create a voiceprint and register, if the frequency of appearance of the voiceprint model marked with the ID number is higher than the threshold;
   generating an ID for the user; and
   storing the ID for the user and a voiceprint model correspondingly in a voiceprint registration database.

2. The method for voiceprint creation and registration according to claim 1, wherein the obtaining a speech request sent by a user further comprises:
   judging whether the speech request needs to be sent to a cloud; if yes, identifying an ID for the user who sends the speech request according to the speech request and in a voiceprint recognition manner.

3. The method for voiceprint creation and registration according to claim 1, wherein the obtaining a speech request sent by a user further comprises:
   judging whether the speech request needs to identify an ID for the user, and if yes, identifying an ID for the user who sends the speech request according to the speech request and in a voiceprint recognition manner.

4. The method for voiceprint creation and registration according to claim 1, wherein the prompting to create a voiceprint and register comprises:
   using a text-related training method to create the voiceprint model for the user whose ID is not identified.

5. The method for voiceprint creation and registration according to claim 4, wherein the using a text-related training method to create the voiceprint model for the user whose ID is not identified comprises:
   providing a registration character string to the user;
   receiving speech information of the user reading the registration character string;
   determining a gender tag for the user according to a gender classifier and speech; and
   generating the voiceprint model for the user according to the gender tag and speech.

6. A device, wherein the device comprises:
   one or more processors;
   a storage for storing one or more programs;
   the one or more programs, when being executed by the one or more processors, enable the one or more processors to implement a method for voiceprint creation and registration, wherein the method comprises:
   obtaining a speech request sent by a user;
   identifying an ID for the user who sends the speech request according to the speech request and in a voiceprint recognition manner;
   marking a voiceprint model for which an ID for a user is not identified, with an ID number;
   deleting the ID number if the frequency of appearance of the voiceprint model marked with the ID number is lower than a threshold;
   prompting to create a voiceprint and register, if the frequency of appearance of the voiceprint model marked with the ID number is higher than the threshold;
   generating an ID for the user; and
   storing the ID for the user and a voiceprint model correspondingly in a voiceprint registration database.

7. A non-transitory computer-readable storage medium on which a computer program is stored, wherein the program, when executed by a processor, implements a method for voiceprint creation and registration, wherein the method comprises:
   obtaining a speech request sent by a user;
   identifying an ID for the user who sends the speech request according to the speech request and in a voiceprint recognition manner;
   marking a voiceprint model for which an ID for a user is not identified, with an ID number;
   deleting the ID number if the frequency of appearance of the voiceprint model marked with the ID number is lower than a threshold;
   prompting to create a voiceprint and register, if the frequency of appearance of the voiceprint model marked with the ID number is higher than the threshold;
   generating an ID for the user; and
   storing the ID for the user and a voiceprint model correspondingly in a voiceprint registration database.

* * * * *